United States Patent [19] [11] 3,807,221
Brown et al. [45] Apr. 30, 1974

[54] MOLECULAR WEIGHT DETERMINING APPARATUS

[75] Inventors: Terry D. Brown; Harold V. Wood, both of Bartlesville, Okla.

[73] Assignee: Phillips Petroleum Company, Bartlesville, Okla.

[22] Filed: June 7, 1971

[21] Appl. No.: 150,410

[52] U.S. Cl. .......................................... 73/57, 73/94
[51] Int. Cl. ............................................. G01n 11/00
[58] Field of Search ................ 73/57, 54, 53, 58, 94

[56] References Cited
UNITED STATES PATENTS
3,500,677 3/1970 Webb ................................. 73/57
1,441,564 1/1923 Eberly ................................. 73/58
2,638,779 5/1953 Wilson ................................. 73/57

FOREIGN PATENTS OR APPLICATIONS
145,386 5/1962 U.S.S.R. .............................. 73/94

Primary Examiner—Richard C. Queisser
Assistant Examiner—J. Roskos
Attorney, Agent, or Firm—Young and Quigg

[57] ABSTRACT

A parallel plate plastometer employs a transducer to determine the force applied on the sample and a differential transformer to determine the reduction in thickness of the sample.

4 Claims, 5 Drawing Figures

INVENTORS.
T. D. BROWN
H. V. WOOD
BY
*Young & Quigg*
ATTORNEYS

MOLECULAR WEIGHT DETERMINING APPARATUS

This invention relates to molecular weight determining apparatus.

In one of its more specific aspects, this invention relates to improved apparatus for determining the melt viscosity of polymers.

Parallel plate plastometers are conventionally employed for determining the molecular weight of high molecular weight polymers. Such apparatus, as for example that shown in "Two Instruments for Measuring the Low-Shear Viscosity of Polymer Melts," R. M. McGlamery and A. A. Harban, Materials Research & Standards, Dec. 1963, pp. 1,003–1,008, have been widely used. However, such apparatus contains certain difficulties attendant to friction losses, temperature control, and the like.

There has now been developed a molecular weight determining device which avoids these difficulties by employing means for accurately measuring the magnitude of the applied forces, the changes in dimension of the sample with the application of those forces, which apparatus can be automated to eliminate constant monitoring by personnel.

According to this invention, there is provided a parallel plate plastometer which comprises a plurality of bearing surfaces, in spaced relationship, electrical means for determining a force applied to at least one of the bearing surfaces, means for measuring the distance between the bearing surfaces upon the application of the force, and means for applying the force to at least one of the bearing surfaces. In the simplest embodiment of this invention, one of the surfaces is fixedly positioned and the other bearing surface is movable thereto upon the application of a force. Electrical means are then provided for determining the force applied and the distance the movable bearing surface moves upon the application of that force.

The apparatus of this invention will be more readily understood if explained in conjunction with the attached drawings in which.

Figure 1:
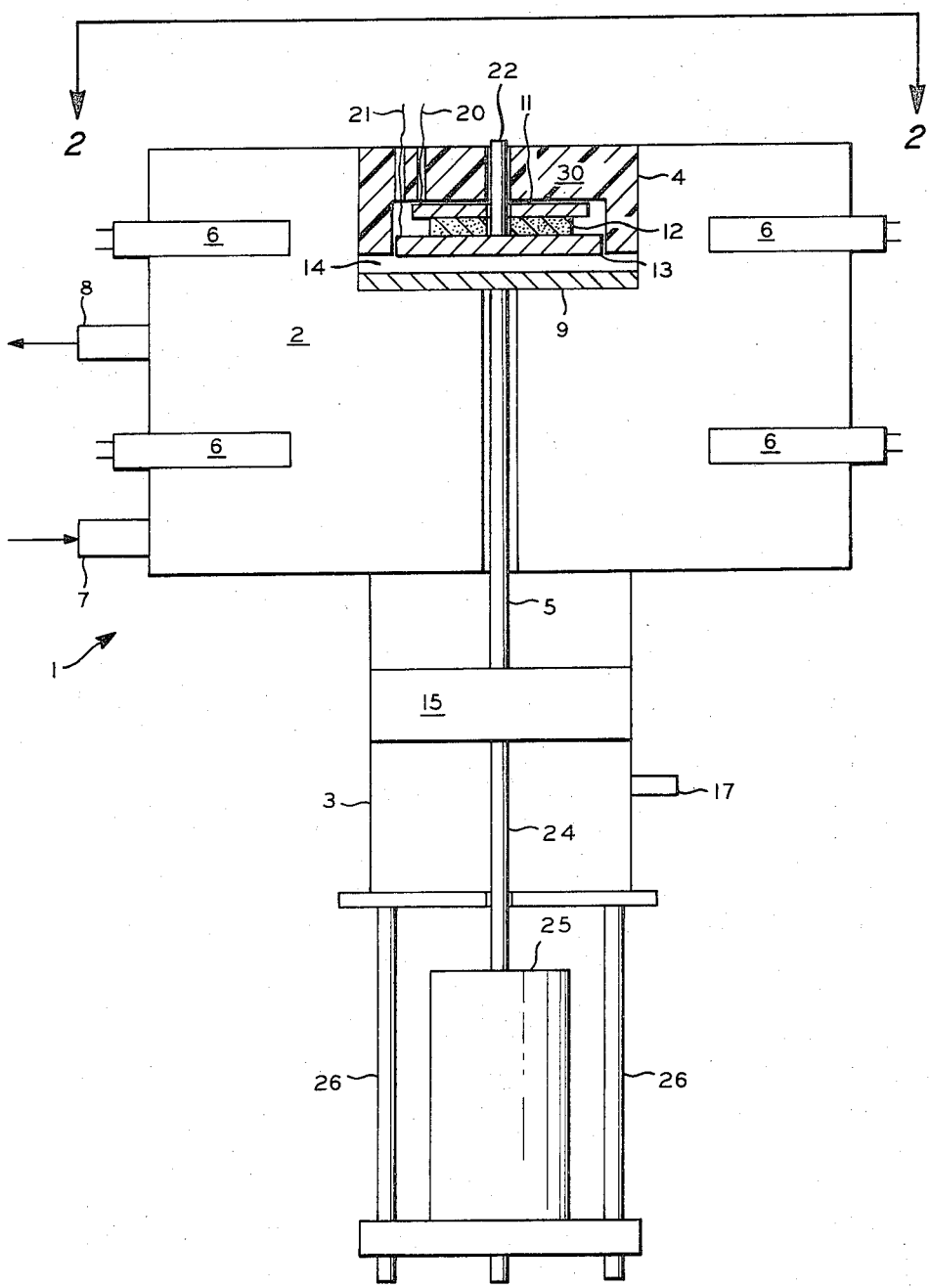
FIG. 1 shows a cross-sectional view in elevation of the apparatus of the invention.
Figure 2:
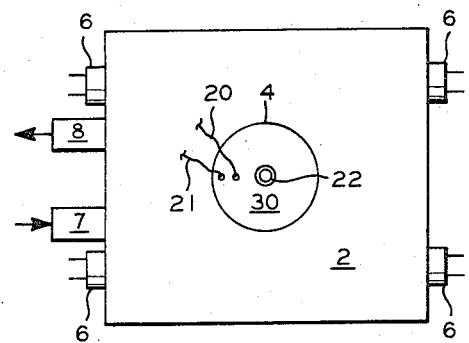
FIG. 2 shows a view of the apparatus through section 2—2 of FIG. 1.

Referring now to FIG. 1 there is shown plastometer 1 comprised of a heating block 2, a cylinder 3, and a sample chamber 4.

Heat-insulated block 2 is composed of any low heat transfer substance and is bored for the admission of piston rod 5 opening into sample chamber 4. The block is adapted with suitable heating elements 6, preferably of the electrical pencil heater type, and with water inlet 7 and water outlet 8 by means of which water is circulated through the block to facilitate its temperature control. By means of the combination of heating elements and water circulation system, the temperature of the block and of the sample positioned in sample chamber 4 can be maintained at any desired test temperature. Any comparable heat control system can be employed.

Pressure plate 9 forms the bottom of chamber 4 which is closed at its upper end by removable insert 30. Positioned within chamber 4 is retainer 11, transducer 12 and bearing plate 13, plate 13 being movably positionable in spaced relationship to plate 9 leaving sample space 14 therebetween. Electrical leads are connected individually to the retainer 11 and to the plate 13, plate 13 being advantageously adapted with guide rod 22.

Plate 9 is mounted on the end of rod 5 which, in turn, is affixed to piston 15 within cylinder 3. Cylinder 3 is adapted with fluid inlet nozzle 17 through which a pressurized fluid is introduced into contact with piston 15 to move pressure plate 9 into contact with a sample of polymer positioned in space 14, the force so exerted being indicated by the extent to which the transducer is compressed as measured by the resistance of the transducer to current applied through leads 20 and 21, lead 20 leading from retainer 11 superimposed on the transducer and lead 21 leading from plate 13. Any comparable pressure-applying system can be employed.

Figure 3:
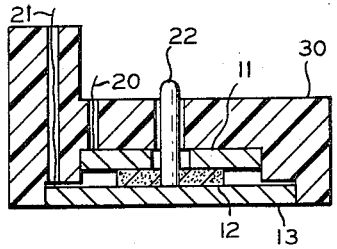
FIG. 3 shows a detailed view of one section of the apparatus.

A detailed view of chamber 4 is shown in FIG. 3 in which a transducer 12 is shown positioned between plate 13 and retainer 11, with electrical leads connected to plate 13 and retainer 11, a washer-type transducer being conveniently employed circumferentially to rod 22. Insert 30 is comprised of a nonconductive insert to electrically insulate the retainer 11 and plate 13.

Referring again to FIG. 1, there is shown extending from piston 15 rod 24 which enters differential transformer 25. The extent to which rod 24 extends into the differential transformer is adjustable by means of transformer adjustment screws 26. Transformer 25 is adapted with electrical leads, not shown, for the measurement of an impressed and a recovered voltage, the recovered voltage being related to the positioning of rod 24 within the transformer.

Figure 4:
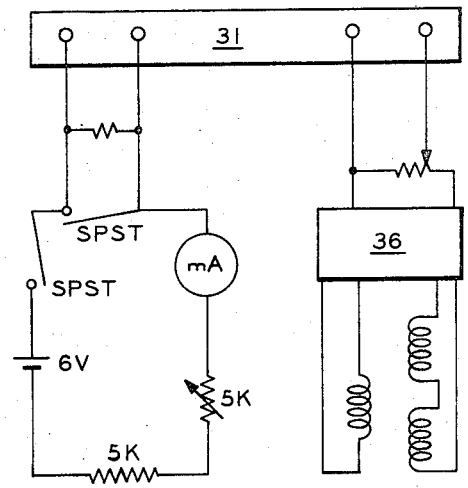
FIG. 4 illustrates the circuitry employed.

Upon the application of an electrical current through leads 20 and 21, through the leads of the differential transformer and upon the application of gaseous pressure through fluid inlet 17 to effect movement of piston 15, it is possible to determine, by means of the transducer, the force exerted upon that sample positioned in space 14. Similarly, it is possible to determine the extent that the force applied decreases the thickness of the sample positioned in space 14 by means of differential transformer 25. Such circuitry as is employed is illustrated in FIG. 4 in which two-channel recorder 31 is employed with one system relating to transducer 12 and with a second circuit relating to differential transformer 25 and a transducer amplifier-indicator 36. The details of this circuitry, the nature of the impressed current, and the types of recorder, amplifier-indicator and transformer will be evident to those skilled in the art.

In the employment of the apparatus of this invention, the transducer and the differential transformer are calibrated. The transducer is calibrated by applying pressure to the plate of chamber 4 in the form of known weights and interrelating the applied weight and resistance of the transducer. The differential transformer is calibrated by placing a micrometer attachment against the plate and piston rod assembly and measuring the output voltage at known increments. The transformer is preferentially operated on that portion of the resulting curve which has a substantially constant slope.

Figure 5:
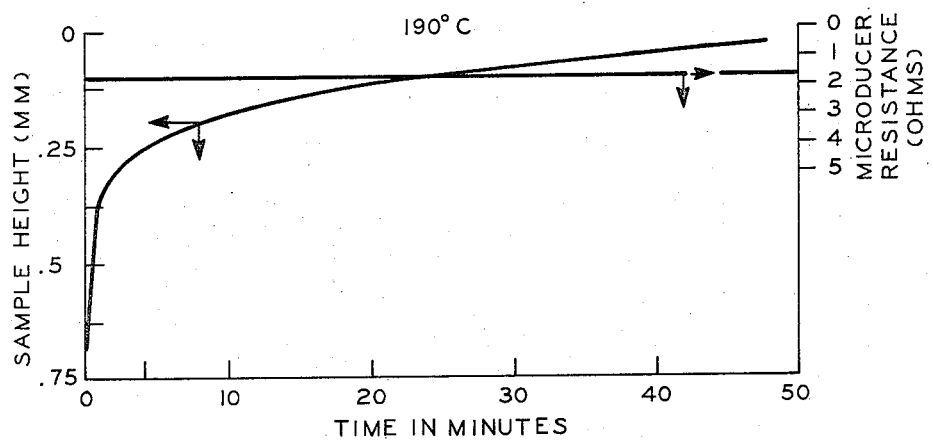
FIG. 5 illustrates a graph of experimental results obtained with the apparatus.

In employing the instrument, a thin cylindrical sample of polymer is weighed and its thickness is determined. It is then placed on plate 9. The sample chamber is positioned in place such that plate 13 is touching the sample. The heating block is brought to the desired temperature and pressure is applied through inlet 17 on piston 15 to compress the sample between plates 9 and 13. As the sample flows radially, the applied pressure and the sample thickness are recorded by the previously-discussed circuitry to produce a curve similar to that shown in FIG. 5.

The method of calculation of the melt viscosity from the data determined is that discussed in "Theory and Application of the Parallel Plate Plastometer," Dienes and Klemm, J. Appl. Physics, 17, 458 (1946).

From the foregoing it will be seen that the apparatus of the present invention can be used to automatically and accurately determine weight average molecular weight of very high molecular weight polymers.

It will be evident that various modifications can be made to the method of this invention. However, such are considered to be within the scope of the invention.

What is claimed is:

1. A parallel plate plastometer which comprises:
  a. a plurality of bearing surfaces in spaced relationship, at least one of said surfaces being movable upon the application of a force to alter the distance between said surfaces, said surfaces being adapted for the positioning of a polymer sample therebetween;
  b. a piston slidably retainable in a cylinder, said piston being affixed to a first rod extending vertically upward into contact with one of said bearing surfaces, said piston being affixed to a second rod extending vertically downward into an after-defined differential transformer;
  c. a differential transformer positioned below said bearing surfaces and said piston and adapted to indicate the distances between said bearing surfaces responsive to the movement of said piston; and,
  d. a transducer positioned above said bearing surfaces and adapted to indicate the magnitude of a force applied to said piston.

2. The plastometer of claim 1 in which said bearing surfaces are positioned within a temperature-controlled chamber.

3. The plastometer of claim 1 in which said transducer is of the washer type.

4. The plastometer of claim 1 in which said differential transformer is adapted for the measurement of an impressed and a recovered voltage.

* * * * *